G. W. BINNS

June 16, 1931. GRINDING Re. 18,103

Original Filed May 9, 1925 2 Sheets-Sheet 1

Inventor
George W. Binns
By
A. H. Parsons
Attorney

G. W. BINNS

June 16, 1931. GRINDING Re. 18,103

Original Filed May 9, 1925 2 Sheets-Sheet 2

Inventor
George W. Binns

By O. H. Parsons
Attorney

Reissued June 16, 1931

Re. 18,103

UNITED STATES PATENT OFFICE

GEORGE W. BINNS, OF CINCINNATI, OHIO, ASSIGNOR, BY MESNE ASSIGNMENTS, TO CINCINNATI GRINDERS INCORPORATED, OF CINCINNATI, OHIO, A CORPORATION OF OHIO

GRINDING

Original No. 1,709,818, dated April 16, 1929, Serial No. 29,214, filed May 9, 1925. Application for reissue filed January 28, 1930. Serial No. 424,040.

This invention relates to improvements in grinding and more particularly to a novel and improved machine for use in the production of formed work, that is to say, of work pieces which are in whole or in part of circular form in cross-section but which are of different diameters at different points longitudinally thereof. The primary object of the present invention is to the provision of a machine which will make it possible to produce work of the general character mentioned in a centerless type of grinder and which will thus eliminate the necessity of accurately forming center-spots and mounting such work on centers prior to the attempted grinding thereof.

A further object of the invention is the provision of a novel structure which will greatly facilitate introduction and removal of the work pieces as well as movement of same into the grinding throat of the machine and will thus greatly increase the possible speed of production of finished work.

With these and other objects in view, the invention comprises the novel features of construction and combination and arrangement of parts substantially as indicated in the accompanying drawings, but it will be understood that any modifications may be made in the specific details of construction within the scope of the appended claims without departing from or exceeding the spirit of the invention.

Other objects will be in part obvious or in part pointed out hereinafter.

In the accompanying drawings, in which is shown a preferred embodiment of my invention, Figure 1 is a perspective view of a machine embodying the invention;

Figure 4:
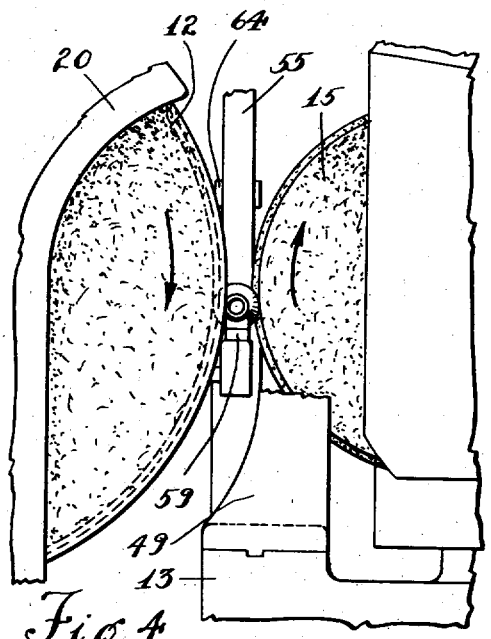
Figure 4 is an end view of the work-receiving throat and associated parts.

In the drawings, in which similar characters of reference are employed to denote corresponding parts throughout the several views, the numeral 10 designates the base of the machine having suitably journaled thereon the spindle 11 for the grinding wheel 12. This wheel, as indicated by the arrow in Figure 4, has its inner face moving downwardly or in the direction toward the bed and is operated at a suitable grinding speed, such as a surface speed of 3,000 or more feet a minute.

Disposed adjacent the grinding wheel is the slide 13 bearing suitable journals for the spindle 14 of the regulating wheel 15. This wheel is of less diameter than the grinding wheel and is disposed in suitable opposition thereto, its inner portion or face proximate to the grinding wheel being driven in an upward direction, as indicated by the arrow in Figure 4. This wheel is normally operated at a slow rate of speed such as a surface speed of less than 100 feet a minute. The movement of this wheel serves to control the rotation of the work piece so that all points thereon will be properly equally presented to the cutting action of the grinding member 12. The foregoing mechanism is in general characteristic of what is termed a centerless grinder. One distinction, however, is that in the ordinary centerless grinder a work support is provided which is stationary or non-movable during the operation of the machine although ordinarily capable of vertical adjustment for initial positioning thereof.

Figure 8:
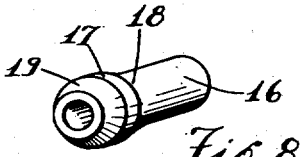
Figure 8 is a perspective view of a workpiece.

The present machine, however, is adapted particularly for the production of work pieces of irregular form. A characteristic type is illustrated in Figure 8, and comprises the cylindrical body portion 16 having the enlargement 17, the tapered intermediate portion 18 and the terminal tapered portion 19. In grinding such an article it is impossible to pass the work axially through the wheels. The work must therefore be introduced into the grinding throat between the wheels 12 and 15 in some rapid and convenient manner.

Figure 5:
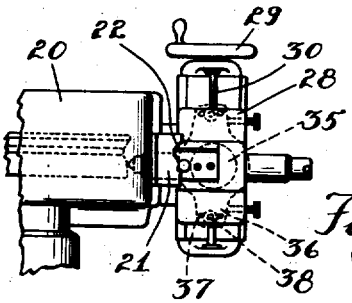
Figure 5 is a plan view of a grinding wheel truing mechanism.
Figure 6:
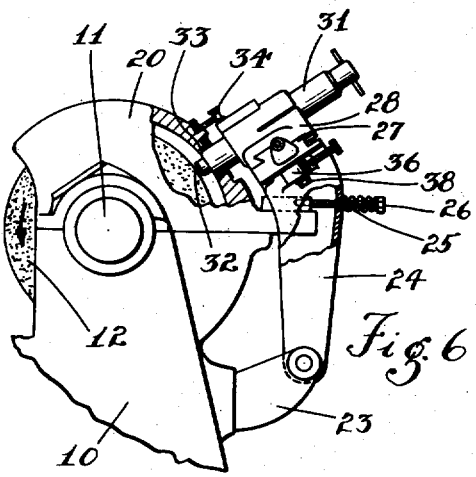
Figure 6 is a side elevation thereof, as seen from the front of Figure 5.

Also, it is necessary that the face of the grinding wheel bears a complementary contour to that of the work to be produced thereby. This contour may be produced as by the truing device shown in detail in Figures 5 and 6, for example. Carried by the hood 20 is the guide or templet 21 having a face 22 corresponding to the transverse configuration which it is desired to produce on the grinding wheel.

Pivoted to bracket 23 on the bed 10 is an arm 24 urged inward by the spring 25 on adjusting screw 26 carried by the hood of the machine. This arm has a dove-tail guide 27 on which moves the slide 28 capable of transverse shifting by operation of handwheel 29 on screw 30. Mounted on this slide is the diamond holder 31 bearing the adjustable diamond point 32 projecting inwardly through a suitably covered aperture 33, while the slide is additionally provided with a contact pin or roller 34 riding on face 22 of templet 21.

To true the grinding wheel to a particular contour a templet, such as templet 21, of corresponding form is mounted on the machine and arm 24 allowed to swing inward until pin 34 is engaged with the templet. The diamond 32 is then adjusted in its holder to properly engage the surface of the stone and the slide 28 moved back and forth on the grinding wheel 12, thus reproducing on the stone a peripheral path corresponding in transverse section to the shape of the templet. In this motion spring 25 yieldingly forces the diamond inward against the stone as controlled by the templet. It will also be noted that if desired the slide as an entirety may be angularly adjusted about the upper end of arm 24, it having a depending boss or hub portion 35 fitting into the arm and lateral wings 36 formed with arcuate slots 37 in which ride the clamp bolts 38 for securing the parts in desired position. This angular adjustment serves to vary the relation of the point of the diamond to the stone so that its surface may be trued off at an angle by the employment of a suitable angularly disposed templet, and the diamond will be disposed at right angle to the line of movement thereof. In this manner the stone may be shaped for a large variety of different forms of work pieces depending upon the particular templets employed.

Figure 3:
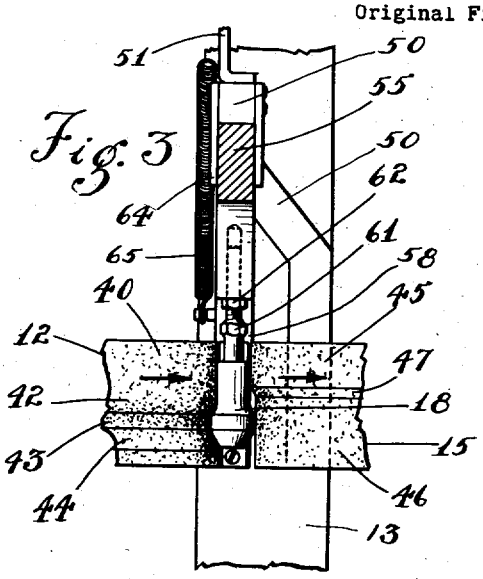
Figure 3 is a fragmentary plan view with the work in operative position.

The manner in which the contour of the work is produced by the grinding wheel will be best understood by reference to Figure 3.

The grinding wheel is formed with a plane cylindrical surface 40 and a cylindrical groove 43, the two being merged by the intermediate tapering surface 42 and the groove being bounded at the opposite side by a second tapering wall 44. The surfaces 40 and 43 form respectively the stem 16 and enlargement 17 of the work piece (see Figure 8) while the tapering walls 42 and 44 of the groove form the beveled surfaces 18 and 19. Other configurations such as arcuate or semi-circular grooves may be formed in place of the groove 33 according to the particular work which it is desirable to produce.

As is customary in centerless grinding, the regulating wheel 15 is provided to hold the work against the grinding wheel. A distinction, however, is that in known forms of centerless grinding the regulating wheel has continuous contact with the work pieces throughout its length. In the present form the regulating wheel is shown as provided with a pair of plain or straight portions 45 and 46, the portion 45 being of greater diameter than that of portion 46 in order that one will just contact with portion 16 of the work piece (see Figure 8) and the other contact with portion 17 thereof. The result is that the work is properly engaged near its ends and best held in the direction toward the grinding wheel, such engagement serving to rotate the work piece either with or without a feeding action on the work in the direction of the axis of the latter. In the form illustrated no attempt is made to have the regulating wheel feed the work, but it floats in the grinding throat, being longitudinally positioned primarily by engagement of the surfaces 42—44 of the grinding wheel with the beveled surfaces 18—19 of the work. The surfaces 45 and 46 of the regulating wheel 15 are trued with an inclined connecting portion 47 so disposed as to be out of engagement with the work piece, as indicated in Figure 3. A suitable truing device capable of transverse movement with respect to the regulating wheel and of withdrawal therefrom when not in use serves to produce the two different diameters and portion 47. This truer is indicated generally at 48 (Figure 2).

Figure 2:
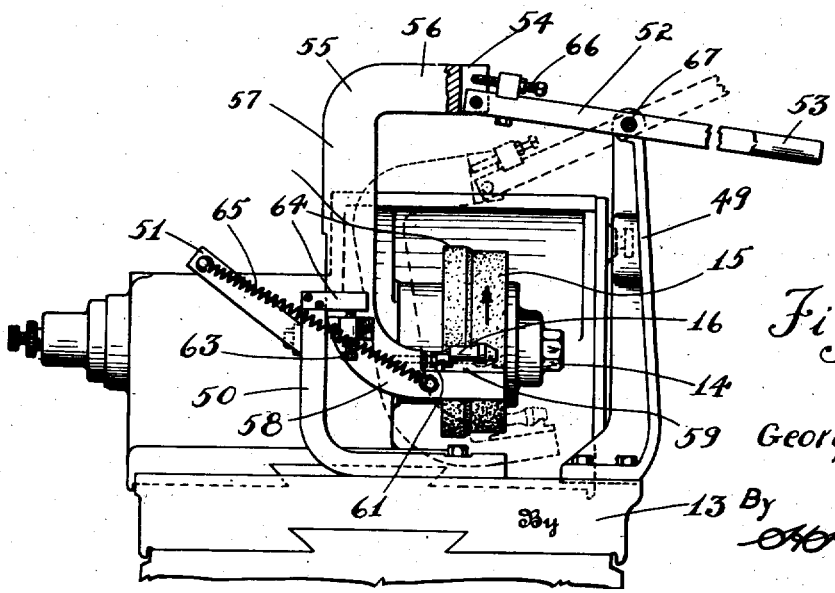
Figure 2 is a transverse section thereof looking in the direction of the regulating wheel.

A preferred form of mechanism for shifting the work into and out of operative position relative to the wheels and holding the work during actual operation thereon is illustrated in Figure 2.

Figure 7:
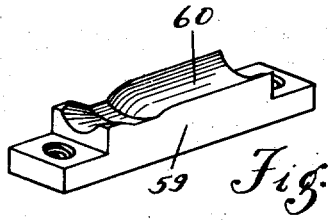
Figure 7 is a perspective view of a work rest block.

Rising from the slide 13 in alinement with the throat between the grinding and regulating wheels are the front bracket 49 and the rear bracket member 50, the latter having an arm or extension 51. Pivoted to the bracket 49 is the control lever 52 having the handle portion 53 at one end and having the other end pivotally secured to the bifurcations 54 of the work supporting yoke member 55. This member, it will be noted, is of yoke or U-like formation having an upper arm 56, an intermediate portion 57 and a lower arm 58 which in operation extends into the grinding throat. This arm 58 has removably secured thereto the work-supporting block or rest 59 (see Fig. 7) having a grooved surface 60 preferably similar in configuration to the configuration of the work piece (see Fig. 8). Arm 58 is further provided with the adjustable stop 61 secured in desired adjusted position as by the lock-nut 62 (see Fig. 3). This stop engages the end of the work piece to limit possible inward movement thereof. If desired, the regulating wheel may be mounted at a slight angle tending to urge the work against the stop during grinding.

By comparison of the positions indicated by the full and dotted lines in Figure 2, it will be seen that when handle 53 is moved downwardly yoke 55 is raised to bring the work piece upward against the portion of wheels 12 and 15 forming the grinding throat, holding the work piece in this position until the grinding has been performed. An adjustable stop 63 on portion 57 of the yoke engages one of the spaced guide arms 64 (Fig. 4) on member 50 to limit the upward movement and thus control the amount of reduction of the work piece. Spring 65 (Fig. 2), having one end secured to arm 58 and the other to the extension 51 on bracket 50, holds the member 55 against bracket 50 during the grinding.

Figure 1:
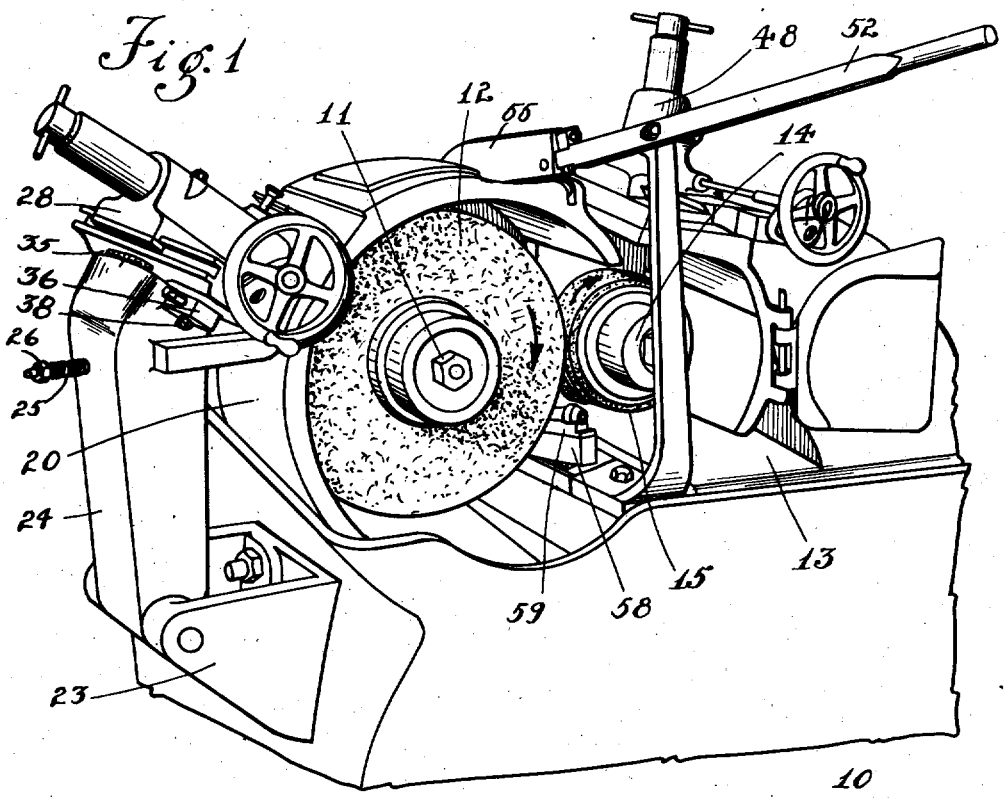

When the grinding is completed, raising of handle 53 depresses the inner end of lever 52 and moves member 55 downwardly so that the work is depressed from the grinding throat. During this swinging movement, the adjustable contact or abutment 66 (Fig. 2) on lever 52 engages the arm 56 at the termination at the bifurcations 54, causing the parts to then move together as a unit about the pivot 67. This will cause member 55 to be moved not only downwardly but also forwardly (toward the right as viewed in Figure 2) as shown by the dotted lines in Figure 2 and the full lines in Figure 1, bringing the work piece in advance of the wheels where it may be readily grasped and removed and a new work piece substituted.

It will be noted that the construction of the parts just described is such that the initial swinging movement of lever 52 will cause a direct vertical or downward movement of the U-shaped bracket member which will be held against the support 50 by the tension of spring 65. However, when adjustable abutment 66 engages the bracket 56, the bracket and lever will then move as an entirety in an arcuate path to a point where removal and replacement of work pieces is facilitated.

From the foregoing description considered in connection with the drawings, the construction of the machine will now be readily understood, and it will be seen, in use, that the operator first sets the wheels at the desired width of grinding throat and by adjustment of the stop 63 regulates the operative position of the work rest or support within the grinding throat. These three parts together form the vertices of an inscribed triangle determining the diameter of cylinder which will be produced by the grinding operation. Stop 63 limits the extent to which the work piece may be moved upwardly, as viewed in Figures 1 and 4, into the narrowing grinding throat. Lever 53 serves to project the work-receiving block 59 below and forwardly of the grinding and regulating wheels for introduction of a work piece. Reverse or downward shifting of handle 53 raises the work upwardly in the grinding throat to the position shown in Figures 2, 3 and 4. In this position the grinding wheel engages the entire length of the work piece at one side to produce the desired contour thereon while the regulating wheel engages the work piece at longitudinally spaced points to accurately control the speed of the rotation and the positive pressure of the work against the grinding wheel. By this process of work production it is unnecessary to true the regulating wheel to correspond with the entire longitudinal contour of the work—but only to form on it spaced cylindrical portions having the required difference in diameter to properly engage the work.

It is to be understood that while the work is shown as having a cylindrical portion at 17, this might be of generally spherical form, it being sufficient that there is a minimum of a peripheral line of contact between the regulating wheel and the work.

I claim:

1. A centerless grinder including opposed grinding and regulating wheels, the grinding wheel having portions adapted to produce cylindrical and non-cylindrical portions on a work piece, and a regulating wheel having a work-controlling portion engaging and urging a cylindrically shaped portion of the work piece toward the grinding wheel whereby the work is reduced to a contoured form contrageometric to that imposed on the surface of the grinding wheel and is controlled in its rotation by the engagement of the regulating wheel with the cylindrical portion thereof.

2. A centerless grinder including a grinding wheel and a regulating wheel, the grinding wheel having a contoured face and the regulating wheel having portions of different diameters opposed to high and low points on the contour of the grinding wheel, and means for supporting a work piece in the throat between said grinding and regulating wheels whereby the portions of different diameter of the regulating wheel hold the work in engagement with the grinding wheel and against axial tilting and control the rate of rotation thereof.

3. A centerless grinding machine including a grinding wheel having a groove formed therein and tapering end walls for the groove, a work support adjacent said grinding wheel, and a regulating wheel opposed to the grinding wheel to complete the grinding throat, said regulating wheel having a plain portion opposed to the grooved and tapered portions of the grinding wheel, and means for shifting one of the members forming the three point engagement of the work at the throat to decrease the relative separation of the parts and control the amount of stock removed from the work piece, substantially as and for the purpose described.

4. A grinding machine including opposed grinding and regulating wheels forming a progressively narrowing work-receiving throat, a work rest, and means for shifting the work rest relative to the narrower portion of the grinding throat and for additionally laterally shifting the work rest relative to the wheels when displaced from the throat.

5. A grinding machine including opposed grinding and regulating wheels forming a grinding throat therebetween, a work rest adapted to be disposed adjacent the throat to operatively support a work piece, positive means for urging the work rest to a position more distant from the grinding throat, and resilient means for shifting the rest toward the grinding throat, to press a work piece carried thereby against the wheels.

6. A machine of the character described including opposed grinding and regulating wheels forming a work-receiving throat therebetween, a work rest, means for vertically shifting the work rest into and out of the grinding throat, and means for laterally shifting the work rest when disengaged from the grinding throat, and resilient means for shifting the work rest into position within the grinding throat.

7. A machine of the character described including opposed grinding and regulating wheels forming a work-receiving throat therebtween, a work rest, means for vertically shifting the work rest into and out of the grinding throat, means for laterally shifting the work rest when disengaged from the grinding throat, resilient means for shifting the work rest into position within the grinding throat, and means for limiting the movement of the work rest into the grinding throat.

8. A centerless grinder including opposed grinding and regulating wheels, a bracket disposed adjacent said wheels, a lever carried by the bracket, and a work rest pivotally supported by the lever and movable into and out of the operative position in the grinding throat between the wheels by movement of said lever.

9. A grinding machine including a contoured work support, a correspondingly contoured grinding member for engaging a work piece on the support and a regulating member of dissimilar contour having portions for engagement with pre-determined sections only of the work piece whereby the work support serves to position the work piece prior to the inception of the grinding action and the grinding member removes the prescribed stock therefrom while the selective engagement of the regulating member with the work piece opposes displacement of the work piece on its rest and controls the rate of rotation thereof.

10. A centerless grinding machine including opposed grinding and regulating wheels, a work rest normally disposed between distant opposed portions of said wheels with its work-receiving face in the direction of the more proximate portions of said wheels, means associated with the rest for accurately axially positioning a work piece thereon, and means for shifting the work rest in the direction of said opposed portions of said wheels to forcibly press a work piece into engagement therewith.

11. A centerless grinder including peripherally opposed grinding and regulating wheels, a work rest disposed below a plane connecting the axes of said wheels, and means for imparting a downward and forward work-discharging movement to said work rest and an inward and upward work-feeding movement thereto, substantially as and for the purpose described.

12. A centerless grinder of the character described, including opposed grinding and regulating wheels and a work rest, means for imparting an initial vertical movement to the work rest, and means for subsequently arcuately shifting the work rest to loading position.

13. A centerless grinder of the character described, including opposed grinding and regulating wheels and a work rest, means for imparting an initial vertical movement to the work rest, and means for subsequently arcuately shifting the work rest to loading position, and additional means for automatically returning the work rest to operative position between the grinding and regulating wheels.

14. A centerless grinder of the character described, including opposed grinding and regulating wheels and a work rest, means for imparting an initial vertical movement to the work rest, means for subsequently arcuately shifting the work rest to loading position, additional means for automatically returning the work rest to operative position between the grinding and regulating wheels, and adjusting means for controlling the final operative position of the work rest.

15. A centerless grinder for the production of non-cylindrical work pieces including opposed grinding and regulating wheels having their operative faces related to produce the desired shape on a work piece, a work rest, means for accurately positioning a work piece on the rest for introduction in prescribed position between the grinding and regulating wheels, and means for shifting the rest and positioned work piece to urge the work into position between said wheels.

16. A machine for the production of contoured work pieces including opposed grinding and regulating wheels, said grinding and regulating wheels, said grinding wheel having a contoured work-engaging operative face for formation of prescribed shape on the work piece, a work rest having a substantially similar conformation to receive and position a rough blank thereon, and means for shifting the work rest with its contoured portion in substantial alinement with that of the grinding wheel and to a position where the grinding wheel will properly act on the supported work piece, the regulating wheel having portions for engagement with the work piece as so shifted to urge same against the grinding wheel and control the rate of rotation of the work piece.

17. A centerless grinder including a supporting bed, opposed grinding and regulating wheels carried thereby, a guide bracket rising from the bed adjacent the wheels, a shiftable yoke member engageable with the guide bracket, said yoke member having a portion subtending the throat between grinding and regulating wheels and a portion overlying the throat, a work support carried by the subtending portion, and means engaging the overlying portion for shifting the yoke, the bracket having portions guiding the yoke in its shifting movement.

18. A machine of the character described including a bed or support, opposed grinding and regulating wheels carried thereby, a guide bracket disposed on the bed adjacent said wheels, a work-shifting member engageable with the bracket, means supporting said member for reciprocating and for oscillatory movement, and means for varying the amplitude of said movements.

19. A machine of the character described including a bed or support, opposed grinding and regulating wheels carried thereby for joint operation on a work piece when introduced therebetween, a guide bracket disposed adjacent the wheels, and means associated with the bracket for controlling the introduction of a work piece, said means including a member mounted for consecutive reciprocating and oscillating movements, means for imparting said movements thereto, and means for varying the effective transition point from one to the other of said movements.

20. A machine for the production of contoured work pieces having an enlarged central portion and reduced terminal portions including a grinding wheel having the prescribed contrageometric contour formed in the operative face thereof, an opposed regulating wheel having a non-contoured cylindrical portion opposing the contoured portion of the grinding wheel for lateral engagement with a work piece to urge same against the grinding wheel, a support for the work piece to be ground having lateral engagement with said work piece, and means for relatively shifting said three work-engaging members to introduce the work piece into the grooved contoured portion of the grinding wheel and subsequently vary the relative separation of the parts to insure proper stock removal from the introduced work piece.

21. A centerless grinding machine comprising a rapidly rotated grinding wheel, a slowly rotated work-regulating wheel, a positioning member for maintaining work of round section in operative contact with the wheels, and means for moving said member in a direction substantially transversely of the axis of the work piece and in opposition to the thrust of the grinding wheel to cause the work to be ground to a predetermined size while being rotated by regulating wheel and thereafter withdraw it to permit removal and replacement of the finished work.

22. In grinding apparatus, in combination, a grinding throat in which work of round section is received for simultaneous grinding and rotation, said grinding throat including a grinding wheel rotatable at relatively high speed, a regulating wheel rotatable at relatively low speed, said wheels being adapted to present adjacent operative surfaces traveling in opposite directions, said wheels being opposed to one another and having their operative surfaces substantially approaching each other so as to form a grinding throat of varying width, and a movable member for holding work in operative relation to said two wheels, and means for moving said work-holding member in a direction substantially transversely of the axis of the work piece held thereby and with the work piece interposed between it and the narrower portion of said grinding throat so as to carry the work toward the narrower portion of said grinding throat, thereby to effect progressive reduction in diameter of the work, and means for limiting the movement of said work-holding member.

23. In grinding apparatus, in combination, a rapidly rotated grinding wheel, a slowly rotated work-regulating wheel, a movable member for holding work of round section between said wheels, and means for moving said member with a work piece thereon in a direction substantially transversely of the axis of the work, thereby to carry said work piece into the grinding throat formed by said two wheels, and in a direction to move and hold the work piece against the thrust of the grinding wheel while being rotated by said regulating wheel.

24. In grinding apparatus, in combination, a grinding throat in which work of round section is received for simultaneous grinding and rotation, said grinding throat including a grinding wheel rotatable at relatively high speed, a regulating wheel rotatable at relatively low speed, said wheels being adapted to present adjacent operative surfaces traveling in opposite directions, said wheels being opposed to one another and having their operative surfaces substantially approaching each other so as to form a grinding throat of varying width, a movable member for holding work in operative relation to said two wheels, and provided with means for preventing movement of a work piece axially with respect to said member, and means for moving said work-holding member in a direction substantially transversely of the axis of the work piece held thereby and with the work piece interposed between it and the narrower portion of said grinding throat so as to move the work into the narrower portion of said grinding throat and in opposition to the thrust of the grinding wheel, thereby to effect progressive reduction in diameter of the work.

In testimony whereof I affix my signature, January 18, 1930.

GEORGE W. BINNS.